United States Patent [19]

Kataoka et al.

[11] Patent Number: 4,752,268
[45] Date of Patent: Jun. 21, 1988

[54] EXHAUST OVEN FOR CATHODE RAY TUBES

[75] Inventors: Satoshi Kataoka, Takatsuki; Hiroshige Nakagawa, Sakurai, both of Japan

[73] Assignee: Chugai Ro Co., Ltd., Osaka, Japan

[21] Appl. No.: 889,888

[22] Filed: Jul. 25, 1986

[30] Foreign Application Priority Data

Jul. 30, 1985 [JP] Japan .................. 60-169398

[51] Int. Cl.⁴ .............................. F23M 9/04
[52] U.S. Cl. ......................... 445/66; 65/119; 219/400; 432/212
[58] Field of Search .......... 445/73, 70, 45, 40, 445/66; 65/41, 119; 432/203, 212; 219/400

[56] References Cited

U.S. PATENT DOCUMENTS

| 3,250,605 | 5/1966 | Matsumoto et al. | 65/41 |
| 3,841,855 | 10/1974 | Montgomery | 65/119 X |
| 3,894,858 | 7/1975 | Rogers | 65/41 X |
| 4,191,525 | 3/1980 | Sallman | 432/203 X |
| 4,498,884 | 2/1985 | Stover et al. | 445/45 |

FOREIGN PATENT DOCUMENTS 68151  6/1979  Japan ................. 445/73

Primary Examiner—Kenneth J. Ramsey
Attorney, Agent, or Firm—Wenderoth, Lind & Ponack

[57] ABSTRACT

An exhaust oven for cathode ray tubes having a housing and a baffle structure arranged within the housing for forming an atmosphere circulating passage between them. There are formed, at least in heating and slow cooling zones within the housing, plural pairs of upper discharge ports through which the circulating atmosphere is supplied towards panel portions of the cathode ray tubes. There are also plural pairs of lower discharge ports through which the circulating atmosphere is supplied towards funnel portions of the cathode ray tubes. Both the upper and lower discharge ports are located on respective sides in the housing. The positioning and discharge direction of the upper and lower discharge ports reduce the temperature difference between different portions of the cathode ray tubes to less than 10° C. Thus, breakage of tubes owing to heat stresses is virtually eliminated. Each of the cathode ray tubes is securely mounted on an evacuation pipe carried on an evacuation cart within the baffle structure and is applied with a heat treatment, while the circulating atmosphere is supplied towards the cathode ray tubes from the upper and lower discharge ports. The gas contained in the cathode ray tubes is evacuated simultaneously.

2 Claims, 2 Drawing Sheets

EXHAUST OVEN FOR CATHODE RAY TUBES

BACKGROUND OF THE INVENTION

The present invention generally relates to a heat-treating furnace and more particularly, to an exhaust oven for cathode ray tubes wherein the cathode ray tube can be subjected to a heat treatment, with a gas contained within the tube being simultaneously evacuated.

An exhaust oven for cathode ray tubes has functions for heat-treating cathode ray tubes and for simultaneously evacuating a gas contained in moisture or paint which is caused to adhere to the inner surfaces of the cathode ray tubes. The exhaust oven for cathode ray tubes generally includes a heating zone, a slow cooling zone, and a final cooling zone. A continuous slot is usually defined on a floor of the oven for allowing evacuation pipes carried on evacuation carts to get therethrough. Although both of the heating and slow cooling zones are of a heat insulating construction, the final cooling zone is not.

DESCRIPTION OF THE PRIOR ART

Conventionally, an exhaust oven of this kind generally has such a construction as disclosed in Japanese Utility Model Laid-Open Publication Jikkaisho No. 58-192448.

More specifically, as shown in FIG. 1, the known exhaust oven is provided with a housing 1, a baffle structure 4 arranged in the housing 1, an atmosphere circulating passage 7 formed between the baffle structure 4 and side walls of the housing 1 or the like, a plurality of recirculation fans 9 disposed on a ceiling portion of the housing 1 and a plurality of heating elements 8 composed of radiant tube burners or the like. Atmosphere within the housing 1 is drawn in from suction ports 5 by the recirculation fans 9 through a perforated plate 2 having a large number of openings at the central portion thereof. The atmosphere is heated up by the aforementioned heating elements 8 and thereafter, the atmosphere is supplied obliquely upwardly from discharge ports 6 composed of a large number of openings which are defined on the lower portion of the baffle structure 4, so as to be circulated within the housing 1.

On the other hand, each cathode ray tube 10 is securely mounted on an evacuation pipe 12, carried on an evacuation cart 11 movable below the housing 1, so as to protrude upwardly through a continuous slot 3 defined entirely on a floor of the housing 1 in a longitudinal direction thereof.

Under the above described conditions, the cathode ray tube 10 is applied with such sequential heat treatments as heating, slow cooling and final cooling in each of the treating zones, while the gas contained in the cathode ray tube 10 is evacuated simultaneously while traveling on the evacuation cart 11.

In the conventional exhaust oven, however, accidents often occur such that the cathode ray tube 10 is damaged and in particular, it is of frequent occurrence with respect to the cathode ray tubes 10 each having a generally flat panel portion 10b. Such flat portions 10b are currently in favor.

In consequence of various investigations into the causes of the aforementioned accidents by the present inventors, it was discovered that because in the aforementioned conventional exhaust oven, the circulating atmosphere is supplied only from the lower discharge ports 6 into the baffle structure 4 as shown in FIG. 1, there substantially occurs a temperature difference of approximately 30° to 40° C. between the funnel portion 10a and the panel portion 10b of the cathode ray tube 10 particularly in the case where it is heated up or gradually cooled down, owing to the fact that the circulating atmosphere which is high in temperature is supplied obliquely upwardly towards the funnel portion 10a of the cathode ray tube 10.

As for the wall thickness of the cathode ray tube 10, given that the panel portion 10b thereof is required to have a sufficient strength by increasing the wall thickness thereof as the surface thereof becomes flat, the funnel portion 10a and the panel portion 10b of the cathode ray tube 10 tend to be increased in thickness.

Accordingly, it has been found that there occurs breakage of the panel portion 10b of the cathode ray tube 10 owing to the fact that the above described temperature difference results in a thermal stress produced thereon. That is, the panel portion 10b heats up or cools down slowly as compared with the funnel portion 10a.

SUMMARY OF THE INVENTION

Accordingly, the present invention has been developed with a view to substantially eliminating the above described disadvantage inherent in the prior art exhaust oven, and has for its essential object to provide an improved exhaust oven for cathode ray tubes that is capable of decreasing the temperature difference between the funnel portion and the panel portion of the cathode ray tube to the utmost, when the tube is heated up or cooled down.

Another important object of the present invention is to provide an exhaust oven for cathode ray tubes of the above described type that is simple in construction and can be manufactured at low cost.

In accomplishing these and other objects, according to one preferred embodiment of the present invention, there is provided an exhaust oven for cathode ray tubes having a housing and a baffle structure arranged within the housing for forming an atmosphere circulating passage therebetween, which structure is provided, at least in a heating and a slow cooling zones within the exhaust oven, with plural pairs of upper discharge ports on respective sides within the housing. The circulating atmosphere is supplied through the discharge ports towards panel portions of the cathode ray tubes. Plural pairs of lower discharge ports on respective sides within the housing through which the circulating atmosphere is supplied towards funnel portions of the cathode ray tubes.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
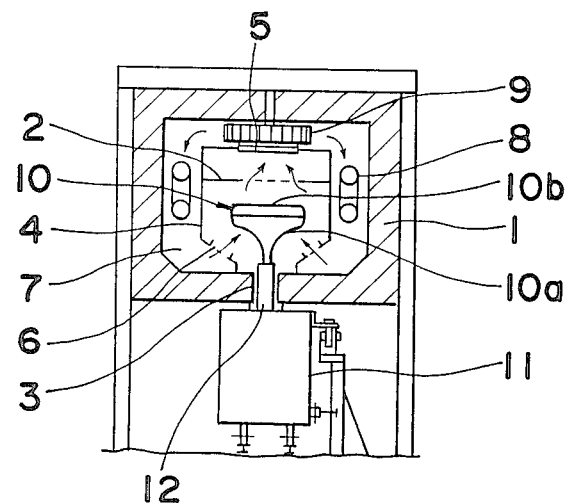
FIG. 1 is a sectional view of a conventional exhaust oven for cathode ray tubes (already referred to)

Before the description of the present invention proceeds, it is to be noted that like parts are designated by like reference numerals throughout the accompanying drawings.

Figure 2:
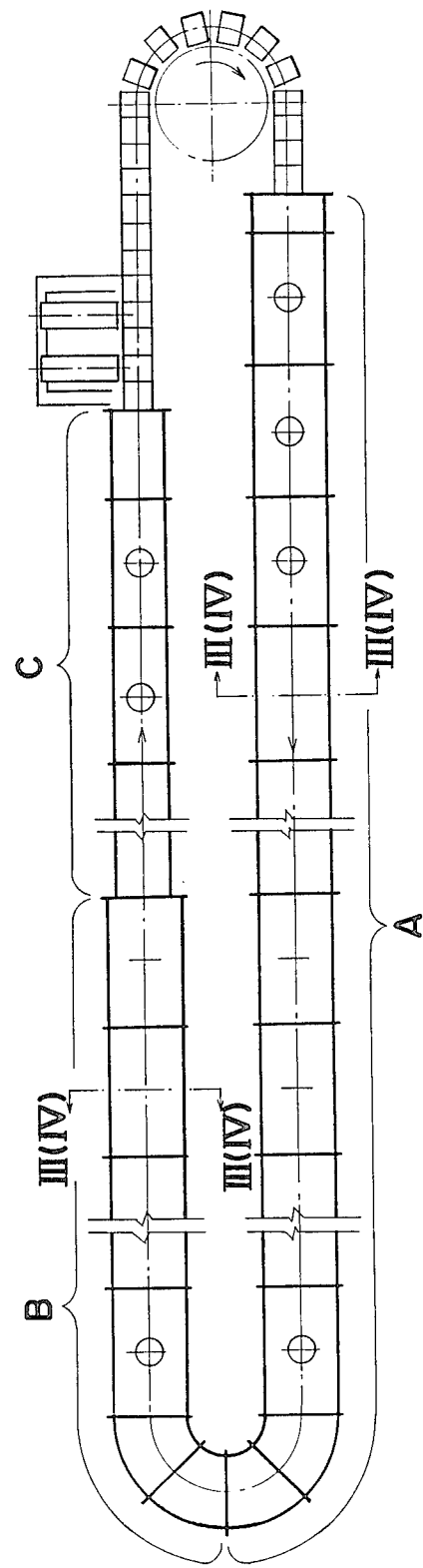
FIG. 2 is a top plan view of an exhaust oven for cathode ray tubes to which the present invention is applied.

Referring now to the drawings, FIG. 2 illustrates an exhaust oven for cathode ray tubes to which the present invention is applied.

There are arranged a heatiang zone A, a slow cooling zone B and a final cooling zone C in the exhaust oven for cathode ray tubes that has a shape similar to that of the figure "U".

Figure 3:
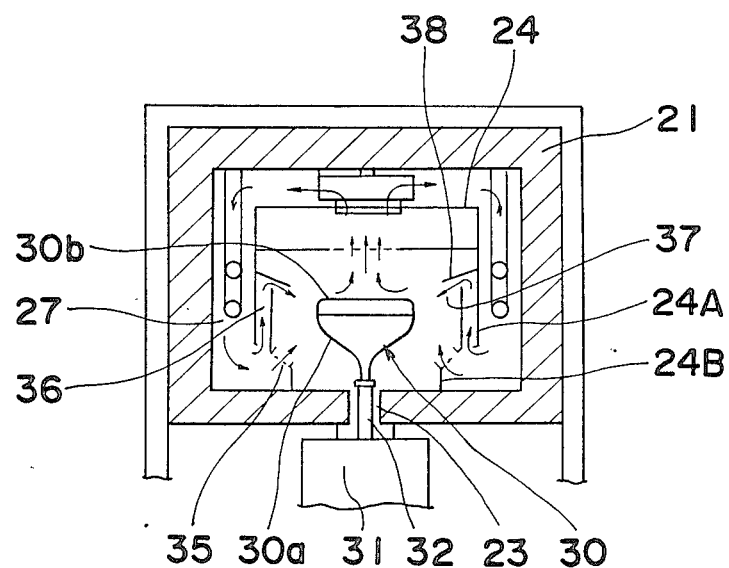
FIG. 3 is a cross section taken along the line III—III in FIG. 2 according to a first embodiment of the present invention.

FIG. 3 is a cross sectional view of the exhaust oven for cathode ray tubes according to a first embodiment of the present invention, wherein each of cathode ray tubes 30 is securely connected, through a continuous slot 23 defined on a floor of the oven, to an end portion of an evacuation pipe 32 disposed on an evacuation cart 31 which is coupled to adjacent evacuation carts and travels together therewith below the floor of the oven.

As clearly shown from a comparative reference with FIG. 1, the exhaust oven for cathode ray tubes of the present invention includes a housing 21 and a baffle structure 24 arranged within the housing 21 so as to form an atmosphere circulating passage 27 therebetween. The baffle structure 24 is provided with upper discharge ports 37 through which the circulating atmosphere is supplied towards panel portions 30b of the cathode ray tubes 30, in addition to the conventional lower discharge ports 35 through which the circulating atmosphere is supplied towards funnel portions 30a of the cathode ray tubes 30 from the lower portion of the atmosphere circulating passage 27. The lower and the upper discharge ports will be respectively referred to as first and second discharge ports hereinafter.

More specifically, the conventional baffle structure 4 has been improved and is divided into an upper and a lower baffle structures 24A and 24B which are so constructed that the upper one 24A is provided with a pair of side plates, the lower portions of which are located above a floor of the oven, and the lower one 24B is arranged inside the upper baffle structure 24A at a certain interval therefrom and is securely mounted on the floor of the oven. In addition, the first discharge ports 35 are formed on the lower portion of the lower baffle structure 24B for discharging the atmosphere obliquely upwardly therethrough; and the second discharge ports 37 are formed on the upper portion of the lower baffle structure 24B for discharging the atmosphere which has passed branch passages 36 defined between the upper and the lower baffle structures 24A and 24B, obliquely downwardly towards the panel portions 30b of the cathode ray tubes 30, with the atmosphere being directed by guide plates 38 disposed on the side plates of the upper baffle structure 24A.

In this embodiment, although the first discharge ports 35 are formed with a large number of circular openings each having a diameter of 8 mm and arranged at regular intervals on the lower baffle structure 24B and the second discharge ports 37 are formed with a plurality of rectangular openings each having dimensions of 40 by 100 mm and arranged at the regular intervals in a longitudinal direction of the oven, each opening of the discharge ports 35 and 37 is not limited to the configuration as indicated above.

Figure 4:
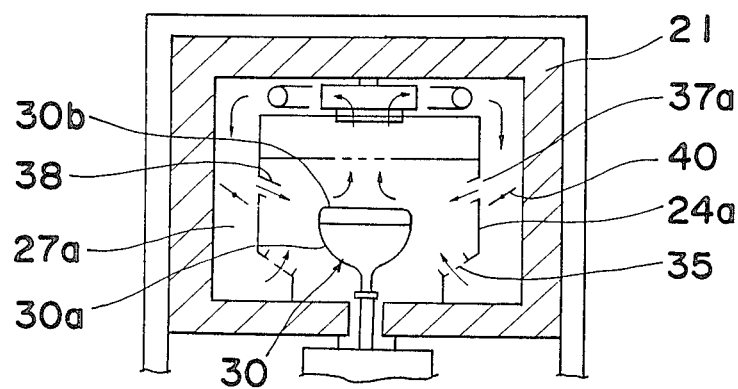
FIG. 4 is a cross section taken along the line IV—IV in FIG. 2 according to a second embodiment of the present invention.

FIG. 4 is the exhaust oven for cathode ray tubes according to a second embodiment of the present invention, wherein the second discharge ports 37a are formed on the upper portion of the side plates of the baffle structure 4 (such as shown in FIG. 1) and a plurality of control dampers 40 are disposed in the atmosphere circulating passage 27a for controlling the amount of the atmosphere discharged from the first and the second discharge ports 35 and 37a.

Meanwhile, in each of the above described embodiments, positions, directions or configurations of the openings of the first and the second discharge ports 35 and 37, 37a, the amounts of the atmosphere discharged therefrom or the like substantially depend upon the configuration, size, position within the oven, or the like, of the cathode ray tube to be applied with the heat treatment. Furthermore, the amounts of the atmosphere discharged from the first and the second discharge ports 35 and 37, 37a substantially depend upon a size of the branch passages 36 in the first embodiment and an opening of the control dampers 40 in the second embodiment. In each embodiment, for example, the circulating atmosphere is supplied into the baffle structure 24 or 24a at the rate of approximately 30% from the first discharge ports 35 and approximately 70% from the second discharge ports 37 or 37a so as to give sufficient heat energy to the panel portion 30b rather than to the funnel portion 30a of the cathode ray tube 30.

Accordingly, given that the cathode ray tube 30 is heated up or gradually cooled down by the circulating atmosphere supplied from the first and the second discharge ports 35 and 37, 37a into the baffle structure 24 or 24a in a heating and a slow cooling zones, there occurs no delay in heating up or cooling down the panel portion 30b of the cathode ray tube 30.

As is seen from the foregoing description, by the exhaust oven for cathode ray tubes according to the present invention, because the circulating atmosphere is supplied into the baffle structure from the plural pairs of the first and second discharge ports on respective sides in the housing, which ports are directed towards the funnel portions and the panel portions of the cathode ray tubes, respectively, the temperature difference between both portions can be lowered to below 10° C. This prevents early heat-up or cool-down of the funnel portion (as in the conventional exhaust oven), that is, the delayed heat-up or cool-down of the panel portion, thus resulting in the breakage of cathode ray tubes being greatly reduced. Furthermore, because the upper discharge ports are so formed as to have opening areas larger than those of the lower discharge ports in order that the amount of the atmosphere discharged from the former is caused to be larger than that from the latter, sufficient heat energy can be transmitted to the panel portion of the cathode ray tube through the circulating atmosphere and consequently, the panel portion of the cathode ray tube can be effectively heated up or cooled down without any delay, as compared with the funnel portion thereof.

It is to be noted that in the above described embodiments, although the heating, slow cooling, and last cooling zones are arranged in the exhaust oven for cathode ray tubes in a shape similar to that of the figure "U" as stated hereinbefore, they may be arranged therein in a straight state or in other state.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An exhaust oven for heat-treating cathode ray tubes of the type having a panel portion and a funnel portion, and for simultaneously evacuating gas contained in each cathode ray tube, said exhaust oven comprising:

a housing having a ceiling portion, opposite side wall portions and a floor portion, and defining therein a heating zone, a slow cooling zone, and a final cooling zone, and a continuous opening provided along a central portion of the floor portion of said housing;

a series of evacuating carts movably disposed below the floor portion of said housing and each provided with an evacuation pipe protruding into said housing through said opening of said central portion of said floor portion of said housing, said evacuation pipe supporting a cathode ray tube rigidly secured thereto and having means for evacuating gas contained in a cathode ray tube;

a baffle structure spaced from said ceiling and side wall portions of said housing in said heating and slow cooling zones, said baffle structure defining with said ceiling and said sidewall portions a hot atmosphere circulating passage between said baffle structure and said housing, said baffle structure including a plurality of first openings in opposite lower portions of said baffle structure, said plurality of first openings having means for directing a first portion of the hot circulating atmosphere towards the funnel portion of a cathode ray tube supported on said evacuation pipe; and a plurality of second openings in opposite intermediate portions of said baffle structure, said plurality of second openings having means directing a second portion of the hot circulating atmosphere towards the panel portion of a cathode ray tube supported on said evacuation pipe, the second portion of the circulating atmosphere being greater than the first portion;

a perforated plate member disposed at an upper portion inside said baffle structure, and having a large number of openings therein;

a heating means disposed between said housing and said baffle structure for heating the circulating atmosphere up to a predetermined temperature; and a recirculation means attached to said housing for forcibly recirculating the hot circulating atmosphere inside said housing.

2. An exhaust oven as claimed in claim 1, wherein said baffle structure includes an upper baffle structure having an upper portion and opposite side portions disposed above said floor portion of said housing, and a lower baffle structure having opposite side portions attached to said floor portion of said housing and spaced inwardly from the opposite side portions of said upper baffle structure, said lower baffle structure having at its opposite lower portions said first openings for supplying the hot circulating atmosphere, said first openings having means for directing hot circulating atmosphere obliquely upwards toward the funnel portion of a cathode ray tube supported on said evacuation pipe, said upper baffle structure having at opposite portions thereof a guide means for directing the hot circulating atmosphere obliquely downwards through said second openings in said upper baffle structure toward the panel portion of a cathode ray tube supported on said evacuation pipe.

* * * * *